United States Patent [19]

Arnoldt

[11] Patent Number: 5,054,823
[45] Date of Patent: Oct. 8, 1991

[54] FLANGE TYPE DUCT CONNECTOR

[75] Inventor: Peter J. Arnoldt, Clairton, Pa.

[73] Assignee: Ductmate Industries, Inc., Monongahela, Pa.

[21] Appl. No.: 475,156

[22] Filed: Feb. 5, 1990

[51] Int. Cl.⁵ ............................................. F16L 23/02
[52] U.S. Cl. .................................... 285/363; 285/424
[58] Field of Search ................................ 285/363, 424

[56] References Cited

U.S. PATENT DOCUMENTS

| 4,218,079 | 8/1980 | Arnoldt | 285/424 X |
| 4,558,892 | 12/1985 | Daw et al. | 285/363 X |
| 4,865,365 | 9/1984 | Meinig | 285/424 X |

FOREIGN PATENT DOCUMENTS 2501611 7/1976 Fed. Rep. of Germany ...... 285/424

Primary Examiner—Dave W. Arola
Attorney, Agent, or Firm—Stanley J. Price, Jr.

[57] ABSTRACT

A duct connector frame having frame sections with a bottom wall, a front wall, a top wall and a rear wall. The rear wall extends downwardly at an angle to the front wall and forms a generally triangular opening in the frame section. A channel shaped pocket or support member is formed in the opening to receive and support the lower edge of a corner piece leg portion and the rear wall, adjacent the top wall, has an inturned portion that forms a stop within the opening for the upper rear surface of the corner piece leg portion. The support member and the stop maintain the corner piece leg portion in the opening in fixed abutting relation with the rear surface of the frame front wall.

4 Claims, 1 Drawing Sheet

FLANGE TYPE DUCT CONNECTOR

BACKGROUND OF THE INVENTION

1. Field of the Invention

This invention relates to a flange type duct connector for sealingly connecting the ends of a pair of sheet metal duct sections and more particularly to the configuration of the duct connecting flange.

2. Description of the Prior Art

U.S. Pat. No. 4,508,376 discloses a flange connection for connecting the ends of generally rectangular duct sections. The duct connection includes a plurality of flange sections connected to each other by means of corner pieces having angularly extending legs. The flange sections and the corner pieces form a rectangular frame which is positioned on the end of a duct section. The corner pieces have offset lower corner portions that permit the edge of the duct to extend into sealing relation with a gasket member positioned between adjacent duct frames.

The frame sections have a front wall and a parallel rear wall with a generally rectangular opening therebetween into which the legs of the corner pieces extend. A receiver member is formed in the frame section for a mastic material in which the duct edge portion is embedded.

U.S. Pat. No. 4,566,724 discloses a duct joint frame in which the frame sections have a rear wall that extends angularly away from the frame section front wall forming a triangularly shaped opening for the corner piece. The rear wall has an inwardly bent bottom portion which terminates in a raised surface or rib against which the lower edge of the corner piece rests when the frame member is assembled. With this configuration, the rearwardly extending leg cannot be secured to the duct side wall by screws or welds.

There is a need for a duct connector frame that has flange sections with angularly extending rear legs to provide improved support for the corner piece and support means within the triangular opening in the flanges to receive and fixedly support a relatively flat corner piece so that the corner piece is not required to have the configuration of the triangular opening in the frame.

SUMMARY OF THE INVENTION

In accordance with the present invention, there is provided a flange section for a duct connector frame that includes a horizontal bottom wall with a front wall extending upwardly from the bottom wall. A rear wall extends downwardly relative to the front wall and terminates in a horizontal end portion. The rear wall also extends angularly relative to the front wall and away from the front wall. The flange section has triangular openings therein for receiving one of the leg portions of a corner piece. The flange section includes a support member extending longitudinally in the triangular opening adjacent the front and bottom wall. A stop member is provided in the flange section triangular opening adjacent the upper portion of the front wall. The support member is arranged to support the corner piece leg lower edge portion and the stop member is arranged to support the corner piece leg upper portion in the opening and in abutting relation with the front wall inner surface.

Further in accordance with the present invention, there is provided a plurality of the above-described frame sections which are connected to each other by the leg portions of corner pieces extending into the openings of the adjacent end portions of the frame sections to form a generally rectangular frame which is secured to the end of a duct section by positioning the end of the duct section between the upper surface of the bottom wall and the undersurface of the horizontally extending portion of the frame section rear wall.

With the support member or pocket within the flange section triangular opening and the upper stop member within the same flange opening, a relatively flat corner piece can be used to connect the adjacent flange sections.

Accordingly, the principal object of the present invention is to provide flange sections for a duct connector frame where generally flat corner piece leg portions are supported within the frame section triangular opening.

Another object of this invention is to provide a support member or pocket in a triangular opening of a flange section for the lower edge portion of a relatively flat corner piece leg.

A further object is to provide a stop member within the triangular opening of a duct flange to maintain the upper portion of the corner piece leg in abutting relation with the rear surface of the front wall.

These and other objects of the present invention will be more completely disclosed and described in the following specification, the accompanying drawings and the appended claims.

DESCRIPTION OF THE PREFERRED EMBODIMENTS

Figure 1:
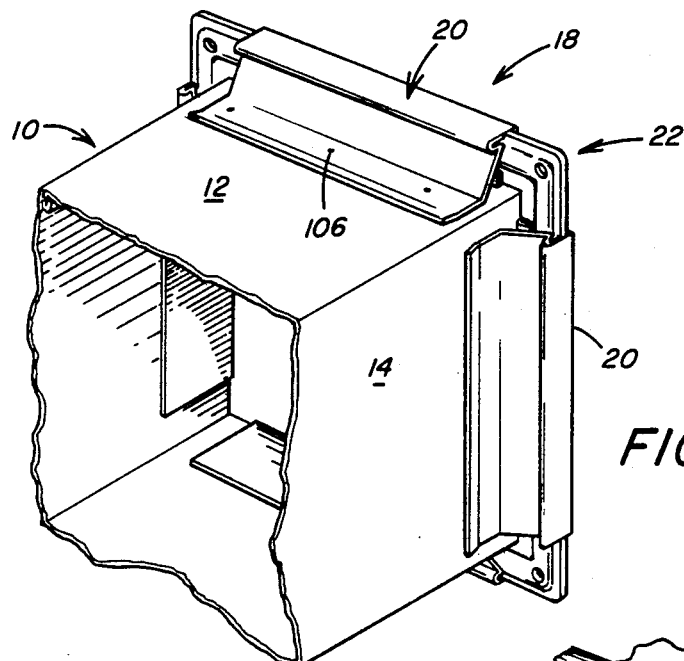
FIG. 1 is a fragmentary perspective view of an end portion of a duct with a connector frame secured thereto.
Figure 2:
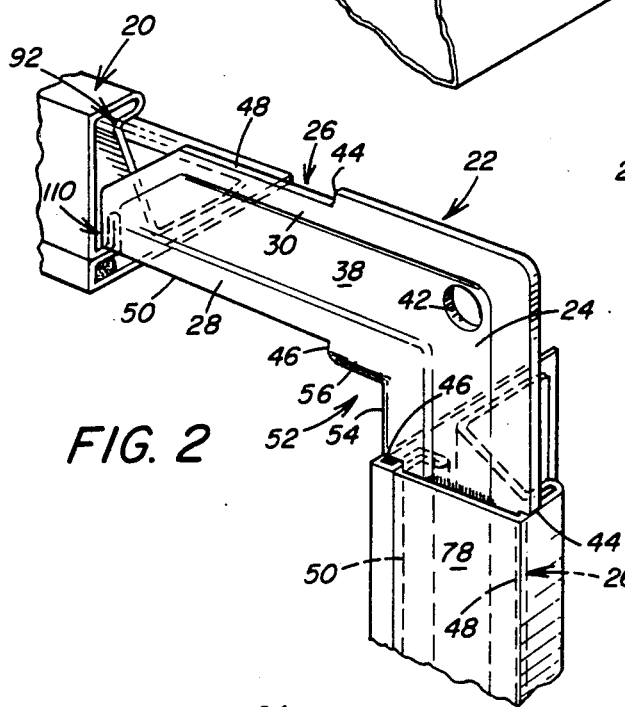
FIG. 2 is an enlarged fragmentary perspective view of two sections of a duct connector frame flange and a leg of the corner piece extending into one section of the flange and the other leg portion adjacent to the triangular opening in the other flange portion.

Referring to the drawings and particularly FIGS. 1 and 2, there is illustrated an end portion of a duct section generally designated by the numeral 10. The duct section has a generally rectangular configuration with an upper duct wall 12 and a side duct wall 14. Although not illustrated, it should be understood that the duct 10 has an opposite side wall and a bottom wall. The upper duct wall 12 and side wall 14 both terminate in a duct edge portion 16 with a corner edge portion therebetween. The other duct walls which are not illustrated also terminate in edge portions with corner portions between adjacent duct walls.

Pairs of ducts 10 are secured to each other by duct connector frame members generally designated by the numeral 18. The frame members are secured to the end portions of the duct 10 and are similar in construction. The duct connector frames are connected to each other by bolts or the like extending through apertures in the corner pieces of the frame.

Each of the frames 18 are formed from a plurality of duct connecting flanges 20. The flanges 20 are identical and are secured to each other to form the rectangular frame 18 by means of corner pieces 22 connecting the end portions of the adjacent flanges. Preferably, the duct connecting flanges 20 are formed on a roll forming machine from sheet metal material and sections are cut therefrom to provide identical flange sections 20. The corner pieces 22 are formed by stamping and are also identical. As later described in detail, the corner pieces 22 have leg portions which are inserted into the triangular openings in the duct connecting flanges 20 to form the generally rectangular duct frame 18 as illustrated in FIG. 1.

The corner piece 22 is illustrated in detail in FIG. 2 and is similar to the corner piece illustrated in U.S. Pat. No. 4,508,376. The corner piece construction of the aforementioned patent is incorporated herein by reference. The corner piece 22 has a generally planar configuration with a corner section or body portion generally designated by the numeral 24 with a pair of legs 26 extending angularly therefrom. One of the legs 26 is illustrated in detail in FIG. 2. The legs 26 extend angularly from the body portion 24 and are in substantially the same plane as corner section 24.

Figure 4:
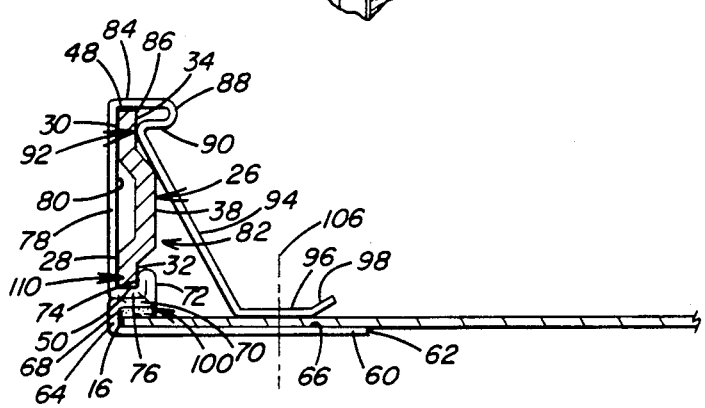
FIG. 4 is a view in elevation of the connector flange illustrating the corner piece leg portion in section and positioned within the triangular opening in the connector frame section.

The corner piece 22 has a peripheral planar portion which extends around the periphery of the corner piece including the leg portions 26 and the body portion 24. FIG. 4 illustrates in section a corner piece leg portion 26 with a front lower planar surface portion 28 and the upper front planar surface portion 30. The leg portion 26 also has a rear lower planar surface portion 32 and an upper planar surface portion 34. The front end of the leg portion 26 has planar surfaces which are in the same plane as the described front and rear planar surfaces The corner piece leg portion 26 has a rearwardly extending embossed portion 38 which provides rigidity and strength to the corner piece leg portions 26. The corner piece body portion or corner section 24 has the same embossed portion 38 so that the entire corner piece 22 has an embossed portion 38 to provide rigidity throughout the entire corner piece.

The corner piece 26 with the embossed rigidifying intermediate portion provides additional strength and rigidity and permits the corner piece to be formed from a stamping having a minimum thickness. It should be understood, however, with the herein disclosed duct frame connecting flanges 20 that relatively flat corner pieces without the embossment 38 may also be employed in connecting the duct flange sections 20 and be rigidly maintained in position within the opening in the frame as later discussed. It is preferred however that the corner piece include the illustrated embossment 38.

The corner piece leg portions 26 may also have apertures therein to permit dimpling of the duct connecting flanges 20 after assembly of the duct frame 18. The corner piece corner section 24 has a bolt aperture 42 therein arranged to receive a connecting bolt for connecting abutting duct frames 18 that are secured to duct sections 10.

The corner piece 22 has shoulders or stops 44 and 46 adjacent the upper and lower edges 48 and 50 of leg 26. Similar shoulders are provided on the other angularly extending leg.

The corner piece corner section 24 has a lower corner portion generally designated by the numeral 52 which has an L-shaped flange 54 as illustrated in FIG. 2. The flange portion 52 has an arcuate offset portion 56 which is curved rearwardly in a direction away from the front planar surfaces 28 and 30. The flange 52 is bounded by the shoulders 46 and the L-shaped flange offset portion 56.

Figure 3:
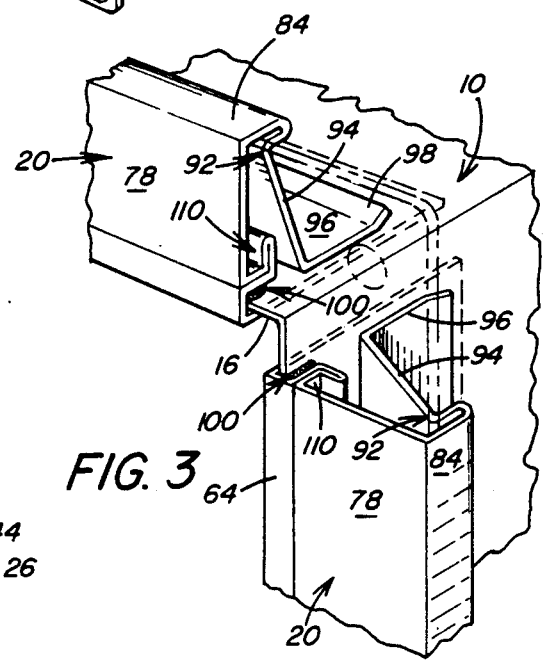
FIG. 3 is a fragmentary perspective view of a corner of the duct connector frame secured to the end of a duct section with the corner piece shown in dotted lines to illustrate the internal triangular configuration of the inner portion of the connector frame section.

Referring to FIGS. 3 and 4, duct connecting flange sections 20 have a profile in section as illustrated. The duct connecting flange 20 has a bottom horizontal wall 60 with an edge portion 62 and an upwardly bent shoulder 64. The flange 60 has an upper surface 66 and the shoulder 64 has an inner surface 68.

The upwardly bent shoulder 64 has an inturned horizontal leg 70 with an upturned end portion 72. The upturned end portion 72 has a downwardly rebent portion forming a downwardly extending leg 74 which terminates in a horizontal leg 76 which is parallel to and abutting the inturned horizontal leg 70. The end of the horizontal leg 70 has an upturned portion which forms the front wall 78 of the frame profile with the upwardly bent shoulder portion 64. The front wall 78 has an inner surface 80 against which the corner piece leg surfaces 28 and 30 abut when the leg is positioned in the opening 82 formed in the frame profile. The upstanding front wall 78 has a rearwardly bent upper edge portion which forms a top wall 84. The top wall 84 has an inner surface 86 against which the upper edge 48 of the corner piece leg 26 abuts.

The top wall 84 has an arcuate downwardly bent end 88. A horizontal leg 90 extends from the end 88 and terminates in a corner or stop 92 that abuts the upper rear planar surface 34 of the corner piece leg portion 26.

Extending downwardly and rearwardly from the stop 92 and at an angle relative to the front wall 78 is a rear wall 94. The rear wall 94 extends away from the front wall 78 and has a horizontally extending lower end portion 96 which is parallel to and spaced from the bottom wall 60. The lower end portion 96 has an upturned edge portion 98 arranged to receive the end of the duct wall 12 between the upper surface 66 of bottom wall 60 and lower surface of the rear wall end portion 96.

The horizontal leg 76 and downwardly extending leg 74 together with the inner surface 80 of front wall form a channel shaped pocket or support generally designated by the numeral 110. The support 110 extends along the entire length of the frame section 20 to support the lower edge 50 of the corner piece leg 26 and the upturned portion 74 and 72 form a shoulder which prevents lateral movement of the corner piece leg lower edge 50.

The upper corner portion or stop 92 of rear wall 94 abuts the corner piece leg rear upper surface 34 along its length and provides support for the corner piece leg 20. Thus, the corner piece leg 26 is supported in the flange opening 82 that has a generally triangular configuration along its lower edge 50 by the channel shaped pocket 110 and along its rear upper surface 34 by the stop 92 to fixedly maintain the leg 26 in the opening 82 of the flange 20 against the rear surface 80 of the flange front wall 78. With the pocket 110 and stop 92, it is now possible to use relatively flat corner pieces in flange openings where the dimensions of the openings are substantially larger than the dimensions of the corner piece legs.

The inner surface of the frame bottom horizontal portion 60 and the inturned portion 70 provides a receiver generally designated by the numeral 100 in which a suitable mastic material is positioned preferrably during the roll forming operation. The edge 16 of the duct penetrates the mastic and is positioned in abutting relation with the inner surface 68 of the upturned member 64 in the receiver 100 to seal the frame to the duct edge portion.

With this arrangement, the pocket 110 formed by member 76 and upturned portion 74 supports the corner piece leg lower portion against the inner surface 80 of front wall 78 and the stop 92 of rear wall portion 94 forms a backstop for the corner piece upper portion and maintains the corner piece upper front planar surface 30 against the frame front wall inner surface so that when the corner piece leg portion is positioned within the opening 82 of the duct frame section 20, it is rigidly secured therein and cannot because of pocket 110 and stop 92 move relative to the frame 20 when a torsional force is applied to the corner piece 22.

With the above described corner piece 22 and the frame sections 20, a generally rectangular frame 18 is formed by inserting the corner piece legs into adjacent triangular openings 82 in the angularly displaced frame sections 20. The corner piece is inserted in the opening 82 until the corner piece edges 44 and 46 abut the end of the frame 20 and form the generally rectangular frame member 18.

The assembled frame 18 is positioned on the rectangular duct 10 with the four duct walls including duct walls 12 and 14 abutting the inner surface 68 of the frame duct connecting flanges to secure the assembled frame 18 on the duct 10. Where desired the duct frame may be secured to the flanges 20 by screws, spot welds or the like diagramatically illustrated by the line 106.

As described in U.S. Pat. No. 4,508,376 a gasket is positioned in abutting relation with the outer surface of the duct connecting flange front wall 78 and adjacent frame members secured to the duct sections are then secured to each other by means of bolts extending through the aligned apertures 42 in each of the corner pieces.

The corner piece corner portion 52 has an inturned or down set portion 56 which permits the edge 16 of the corner section of the duct 10 to extend into abutting relation with the gasket to seal the edge portion of the duct at the corner portion of the duct.

The sloping rear wall 94 of the flange 20 provides a strong rigid frame member for the duct sections especially with the horizontal section 96 secured to the duct wall 12 and the rearwardly extending horizontal flange portion 60.

According to the provisions of the Patent Statutes, I have explained the principal preferred construction and mode of operation of my invention and have illustrated and described what I now consider to represent its best embodiments. However, it should be understood that within the scope of the appended claims, the invention may be practiced otherwise than as specifically described herein.

I claim:

1. A duct connector frame comprising,
a plurality of corner pieces each having;
(a) a pair of angularly extending legs, each of said legs having a front planar surface portion, a rear planar surface portion, a lower portion and an upper portion, a plurality of flange sections each having;
(a) a horizontal bottom wall,
(b) a front wall extending upwardly from said bottom wall,
(c) a rear wall extending downwardly relative to said front wall and terminating in a horizontal end portion, said rear wall extending angularly away from said front wall, said rear wall having an inturned stop member adjacent the upper portion of said rear wall,
(d) a top wall extending generally perpendicularly from said front wall and terminating in a downwardly bent end,
(e) a horizontal leg having two longitudinal ends, said horizontal leg being connected at one longitudinal end to said downwardly bent end and at said other longitudinal end to said inturned stop member, said horizontal leg positioned in a plane generally parallel to said top wall,
(f) said flange sections each having openings therein for receiving one of said leg portions of said corner piece,
(g) said flange sections each having a support member within said opening and extending longitudinally in said opening adjacent said bottom wall, and
said corner piece leg portions positioned in said flange section openings with said lower portion supported by said support member in said flange section opening and said upper portion abutting said inturned stop member on said rear wall in said opening to fixedly position said corner piece relative to the end portions of adjacent flange sections.

2. A duct connector frame as set forth in claim 1 in which,
said support member in said flange sections includes an upturned edge portion forming a channel shaped support member for said corner piece lower portion.

3. A duct connector frame as set forth in claim 2 in which,
one surface of said corner piece lower portion arranged to abut the inner surface of said front wall and the other surface of said corner piece lower portion arranged to abut said support member unturned edge portion within said channel shaped support member, and
one surface of said corner piece upper portion arranged to abut the inner surface of said front wall and the other surface of said corner piece upper portion arranged to abut said rear wall inturned stop member.

4. A flange section for use in a duct connector frame comprising,
a horizontal bottom wall,
a front wall extending upwardly from said bottom wall,
a rear wall extending downwardly and terminating in a horizontal end portion, said rear wall extending angularly away from said front wall, said rear wall having an inturned stop member adjacent the upper potion of said rear wall,
a top wall extending generally perpendicularly from said front wall and terminating in a downwardly bent end,
a horizontal leg having two longitudinal ends, said horizontal leg being connected at one longitudinal end to said downwardly bent end and at said other longitudinal end to said inturned stop member, said horizontal leg positioned in a plane generally parallel to said top wall, said flange section having an opening therein for receiving at opposite ends thereof a leg portion of a corner piece, said flange section having a support member extending longitudinally in said opening adjacent said bottom wall, and said openings in said flange section arranged to receive corner piece leg portions with the leg lower portion supported by said support member and the leg portion upper portion abutting said stop member.

* * * * *